US008504822B2

(12) United States Patent
Wang et al.

(10) Patent No.: US 8,504,822 B2
(45) Date of Patent: *Aug. 6, 2013

(54) TRANSPARENT PROXY OF ENCRYPTED SESSIONS

(75) Inventors: Jianxin Wang, San Jose, CA (US); Anupama Sundaresan, San Jose, CA (US); Vijaya Bharathi Kaza, Santa Clara, CA (US); Dario Calia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,407

(22) Filed: Jul. 3, 2012

(65) Prior Publication Data

US 2012/0272058 A1 Oct. 25, 2012

Related U.S. Application Data

(63) Continuation of application No. 11/605,087, filed on Nov. 28, 2006, now Pat. No. 8,214,635.

(51) Int. Cl.
*H04L 29/06* (2006.01)
*G06F 9/00* (2006.01)

(52) U.S. Cl.
USPC .............................................. 713/156; 716/11

(58) Field of Classification Search
USPC ............ 713/151, 153, 156, 168, 175; 726/11, 726/12, 14, 15
See application file for complete search history.

(56) References Cited

U.S. PATENT DOCUMENTS

| | | | |
|---|---|---|---|
| 5,491,750 A | 2/1996 | Bellare et al. |
| 5,586,260 A | 12/1996 | Hu |
| 5,915,087 A | 6/1999 | Hammond et al. |
| 6,003,084 A | 12/1999 | Green et al. |
| 6,182,141 B1 | 1/2001 | Blum |
| 6,298,380 B1 | 10/2001 | Coile et al. |
| 6,505,254 B1 | 1/2003 | Johnson et al. |
| 6,894,981 B1 | 5/2005 | Coile et al. |
| 6,978,367 B1 | 12/2005 | Hind et al. |
| 7,013,389 B1 | 3/2006 | Srivastava et al. |
| 7,047,560 B2 | 5/2006 | Fishman et al. |
| 7,111,162 B1 | 9/2006 | Bagepalli et al. |
| 7,136,359 B1 | 11/2006 | Coile et al. |
| 7,508,826 B2 | 3/2009 | Miyata et al. |
| 7,954,144 B1 | 5/2011 | Ebrahimi et al. |

(Continued)

OTHER PUBLICATIONS

Dierks, T., et al. , Request for Comments 4346, entitled "The Transport Layer Security (TLS) Protocol Version 1.1", Network Working Group, IETF, Apr. 2006, pp. 1-82.

*Primary Examiner* — Nathan Flynn
*Assistant Examiner* — Abdullah Almamun
(74) *Attorney, Agent, or Firm* — Cesari and McKenna, LLP

(57) ABSTRACT

In one embodiment, a proxy device located between a first device and a second device intercepts a security session request for a security session between the first device and the second device. The proxy device obtains security information from the first device that includes at least a subject name of the first device. The proxy device creates a dynamic certificate using the subject name of the first device and a trusted proxy certificate of the proxy device. The proxy device establishes a security session between the proxy device and the second device using the dynamic certificate. Further, the proxy device establishes a security session between the first device and the proxy device using the trusted proxy certificate of the proxy device. The two security sessions collectively operate as a security session between the first device and the second device.

20 Claims, 7 Drawing Sheets

U.S. PATENT DOCUMENTS

| | | |
|---|---|---|
| 2002/0025046 A1 | 2/2002 | Lin |
| 2003/0061353 A1 | 3/2003 | Johnson et al. |
| 2004/0015725 A1 | 1/2004 | Boneh et al. |
| 2004/0146163 A1 | 7/2004 | Asokan et al. |
| 2004/0168054 A1 | 8/2004 | Halasz et al. |
| 2004/0268148 A1 | 12/2004 | Karjala et al. |
| 2005/0050362 A1 | 3/2005 | Peles |
| 2005/0108430 A1 | 5/2005 | Howarth et al. |
| 2006/0174106 A1 | 8/2006 | Bell et al. |
| 2007/0088834 A1 | 4/2007 | Litovski |
| 2007/0192845 A1 | 8/2007 | Lankheim |
| 2007/0245414 A1 | 10/2007 | Chan et al. |
| 2008/0046714 A1 | 2/2008 | Suganthi et al. |
| 2009/0013399 A1 | 1/2009 | Cottrell |

TRANSPARENT PROXY OF ENCRYPTED SESSIONS

RELATED APPLICATIONS

The present application is a continuation of U.S. patent application Ser. No. 11/605,087, filed on Nov. 28, 2006 by Jianxin Wang et al., titled "Transparent Proxy of Encrypted Sessions", the contents of which are incorporated by reference herein in their entirety.

TECHNICAL FIELD

The present disclosure relates generally to computer networks, and, more particularly, to security (e.g., encryption) sessions between a client and a server.

BACKGROUND

Generally, firewalls are devices in computer networks that are configured to apply one or more policies to traffic (e.g., data packets) that traverse the firewalls. For instance, the firewalls may inspect the traffic at a basic level, e.g., at source and destination addresses of packet headers, to permit or deny traversal of the packets based on access lists corresponding to the addresses. Often, the firewalls may also be configured to perform deep packet inspection on the traffic, wherein the firewalls inspect the packets further than simply the headers, e.g., to the data contained within the packets ("payload"). For example, firewalls are often utilized to inspect the payloads of packets for Voice over Internet Protocol (VoIP) or Video over IP applications (e.g., "Layer 7" application layer data), as well as for Network Address Translation (NAT) functionality and dynamic pinhole (access) control, as will be understood by those skilled in the art. Notably, packet inspection is not limited to simply reading the payload contents of packets, but also to modification of the packets, such as rewriting portions of the packets that contain address/port information (e.g., for NAT).

As more traffic within computer networks (e.g., the Internet) moves toward a secured mode of transport (e.g., authenticated and/or encrypted), traditional firewalls lose their ability to look into the packet payload, and particularly their ability to modify the packets. In other words, the firewalls are unable to deeply inspect the traffic payload because of their inability to decrypt the traffic. Accordingly, one option is to allow all secured traffic to traverse the firewalls without inspection. However, this option negates the use of the firewalls to inspect traffic, thereby potentially allowing illegitimate and/or harmful traffic to pass through freely, particularly for the Session Initiation Protocol (SIP) for VoIP traffic. Also, NAT functionality is generally unavailable when signaling is encrypted, as will be understood by those skilled in the art.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, at least one server and at least one client are configured to trust a proxy certificate of an intermediate proxy device. The proxy device intercepts a client-server security session request message sent from the client to the server. In response, the proxy device initiates a proxy-server security session with the server and obtains server security information from the server. Then, the proxy device initiates a client-proxy security session with the client using the trusted proxy certificate, and obtains client security information from the client. Upon obtaining the client security information, the proxy device creates a dynamic certificate using the obtained client security information and the trusted proxy certificate, and establishes the initiated proxy-server security session with the dynamic certificate. The proxy device then establishes the initiated client-proxy session, wherein the client-proxy security session and proxy-server security session transparently appear to the client and server as the requested client-server security session.

Description

Figure 1:
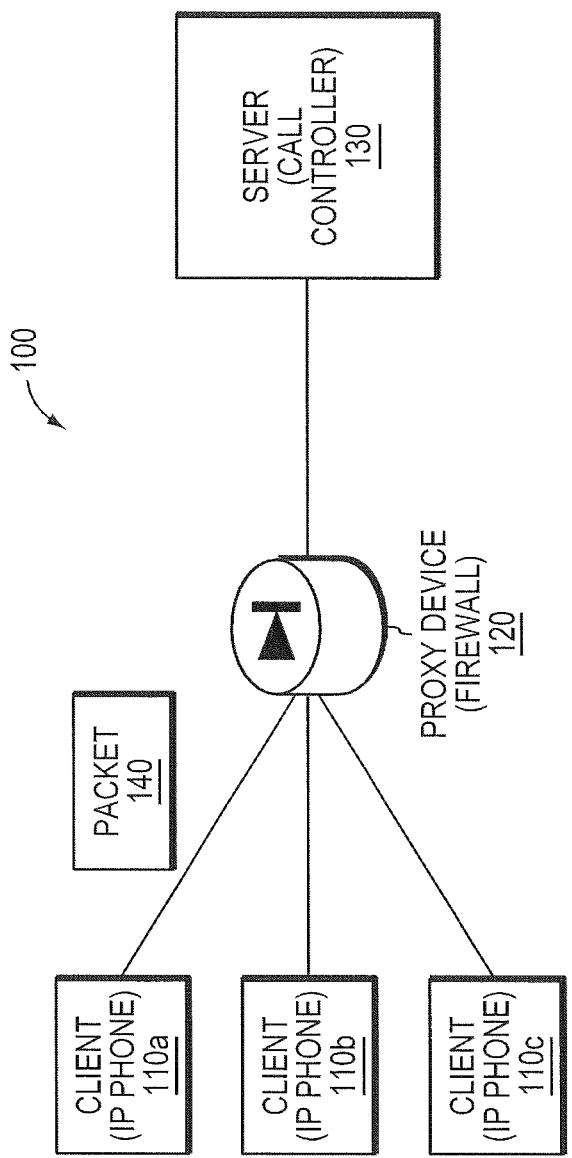
FIG. 1 illustrates an example computer network.

FIG. 1 is a schematic block diagram of an example computer network 100 illustratively comprising nodes/devices, such as one or more clients 110*a-c* and one or more servers 130 interconnected by links as shown. Also, an intermediate proxy device 120 is located between the client 110 and the server 130 in accordance with one or more embodiments described herein. Illustratively, as described herein, an example embodiment of the client 110, proxy 120, and server 130 may be a Voice over Internet Protocol (VoIP) configuration. As such, the client may be an IP phone, the server may be a call controller, and the proxy device may be a firewall. Those skilled in the art will understand that any number of nodes, devices, links, etc. may be used in the computer network, and that the view shown herein is for simplicity. Those skilled in the art will also understand that while the embodiments herein are described generally, they may apply to any network configuration (particularly, to network configurations other than for VoIP sessions) within a single Autonomous System (AS) or area, or throughout multiple ASes or areas, etc.

Data packets 140 (e.g., traffic sent between the client and server) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
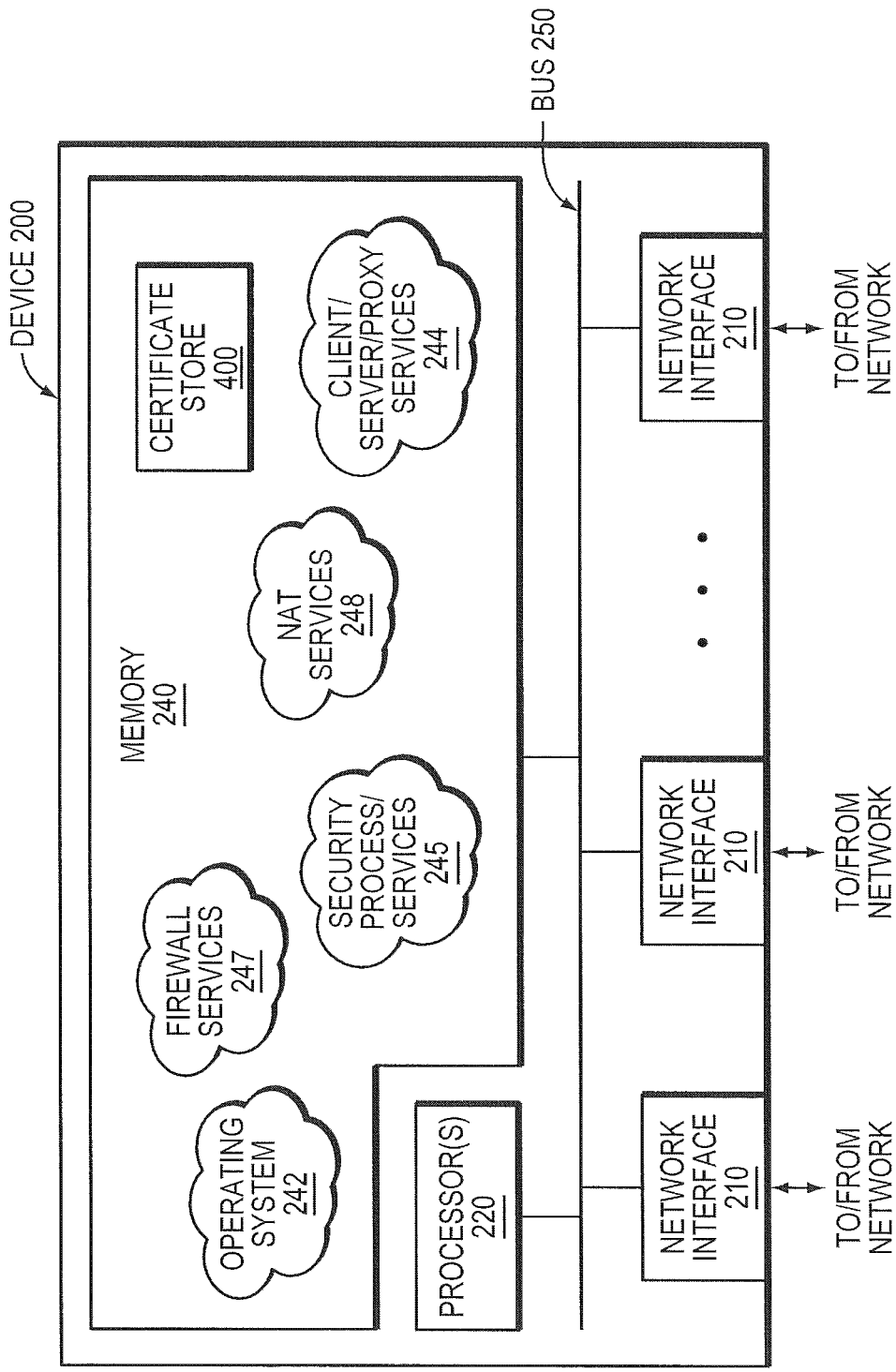
FIG. 2 illustrates an example network device/node.

FIG. 2 is a schematic block diagram of an example node/device 200 that may be advantageously used with one or more embodiments described herein, e.g., as a proxy device 120 (or client 110 or server 130). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a certificate store 400. An operating system 242, portions of which is typically resident in memory 240 and executed by the processor(s), functionally organizes the node by, inter alia, invoking network operations in support of software processes and/or services executing on the device. These software processes and/or services may comprise client/server/proxy services 244 (e.g., depending upon the particular device 200) and security process/services 245 and, for an illustrative proxy device 200, firewall services 247 and Network Address Translation (NAT) services 248. It will be apparent to those skilled in the art that other processor and memory means, including various computer-readable media, may be used to store and execute program instructions pertaining to the inventive technique described herein.

Client services 244 (i.e., for clients 110) contain computer executable instructions executed by processor(s) 220 to perform functions related to client device functionality. For example, in an illustrative embodiment, client services 244 provides for the signaling and transmission of VoIP traffic, such as where the client 110 is an IP phone, as will be understood by those skilled in the art.

Server services 244 (i.e., for servers) contain computer executable instructions executed by processor(s) 220 to perform functions related to server device functionality. For example, in an illustrative embodiment, server services 244 also provides for the signaling (control) and transmission of VoIP traffic, such as where the server 110 is a call controller to interact with the client IP phones, as will also be understood by those skilled in the art.

Security process/services 245 (e.g., for clients 110, proxy devices 120, and/or servers 130) contain computer executable instructions executed by processor(s) 220 to perform functions related to security and security protocols. For example, the Transport Layer Security (TLS) protocol is a security protocol that may be run on top of TCP/IP, and involves security handshakes, key exchanges, etc. TLS is further described in RFC (Request for Comments) 4346, entitled *The Transport Layer Security (TLS) Protocol Version* 1.1 dated April 2006, the contents of which are hereby incorporated by reference as though fully set forth herein. Notably, other security protocols, such as the Secure Socket Layer (SSL) protocol (of Netscape Communications Corp.), IP Security (IPSec), etc., may also be advantageously used herein.

Generally, two devices interested in establishing a security session (e.g., for encryption of traffic between a client 110 and server 130) may send session initiation request/reply messages ("security messages") to exchange security information, as will be understood by those skilled in the art. For instance, each device may have its own corresponding public-private key pair, e.g., according to a public key infrastructure (PKI). Public and private keys are well known in the art. For instance, devices within a network 100 are allowed to see anyone's public key, while each device's private key is not disclosed. Traffic may be encrypted using a public key of the recipient, which then decrypts the traffic with its own private key. A private key may also be used to generate a "certificate" for a particular device, such as a digital signature used to authenticate the device to a recipient. For example, a device may "sign" a certificate by encrypting various information, such as a "subject name" of the device (e.g., an identification of the device, such as a Media Access Control, or "MAC" address of the device), using the private key of the device (to which only that device has access). A device receiving the certificate may verify the identity of the sending device using the sending device's public key and the certificate issuer information (e.g., the trusted certificate authority that signs the certificate). A device may also send certain randomly generated numbers (e.g., session ID) to uniquely identify the security session under negotiation. The exchange of security information between the two devices (e.g., client and server) may thus include the exchange of the keys, the certificates, and the random numbers. The devices may also extract a shared session-specific key from the exchanged information.

Figure 3:
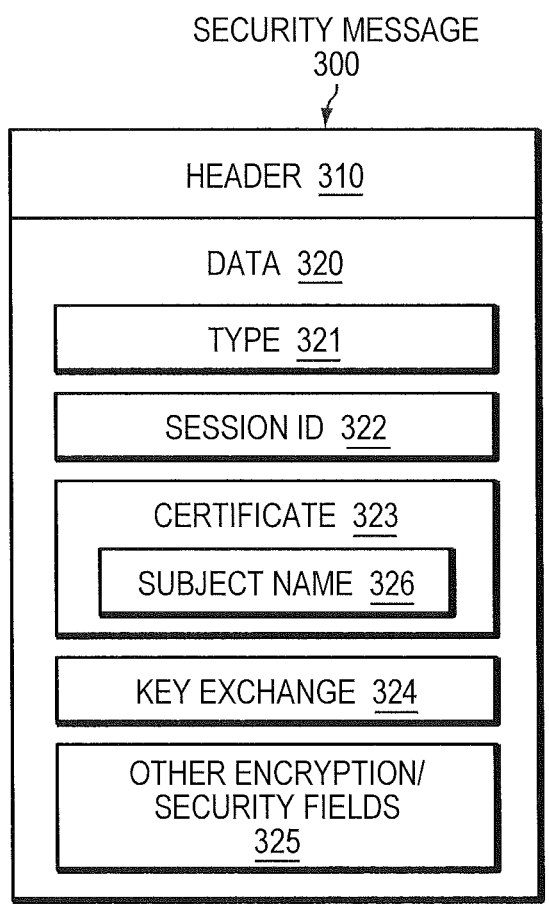
FIG. 3 illustrates an example security message.

FIG. 3 is a schematic block diagram of an example security message 300 that may be used in accordance with one or more embodiments described herein. Notably, while the security message 300 is illustratively shown as a TLS handshake message, those skilled in the art will understand that other types of security messages (e.g., for TLS or other protocols such as SSL, etc.) may be used in accordance with the embodiments described herein. Security message 300 may comprise a conventional header information field 310, such as an IP header and/or other suitable encapsulation protocol header, as will be understood by those skilled in the art. A data field 320 contains the payload data of the message ("security information"), generally relevant to the particular type of security message.

Illustratively, data field 320 (e.g., of a TLS handshake) may comprise a type field 321, a session identifier (ID) field 322, a certificate field 323, a key exchange field 324, and other security/encryption fields 325 (e.g., data field 320 may have a particular one of these fields per corresponding handshake message). Certificate field 323 may be used to carry the sending device's certificate, along with a corresponding "subject name" field 326 as described above (which, illustratively, need not be a separate field within the certificate 323, but rather a portion of the information contained within the certificate, as will be understood by those skilled in the art). Also, key exchange field 324 may be used to carry/advertise the sending device's public key (or secret key, if secret key encryption is used), which may be a separate field or included within the certificate. Other security/encryption fields 325 will be understood by those skilled in the art (e.g., as defined in the various security protocols and extensions thereto).

Figure 4:
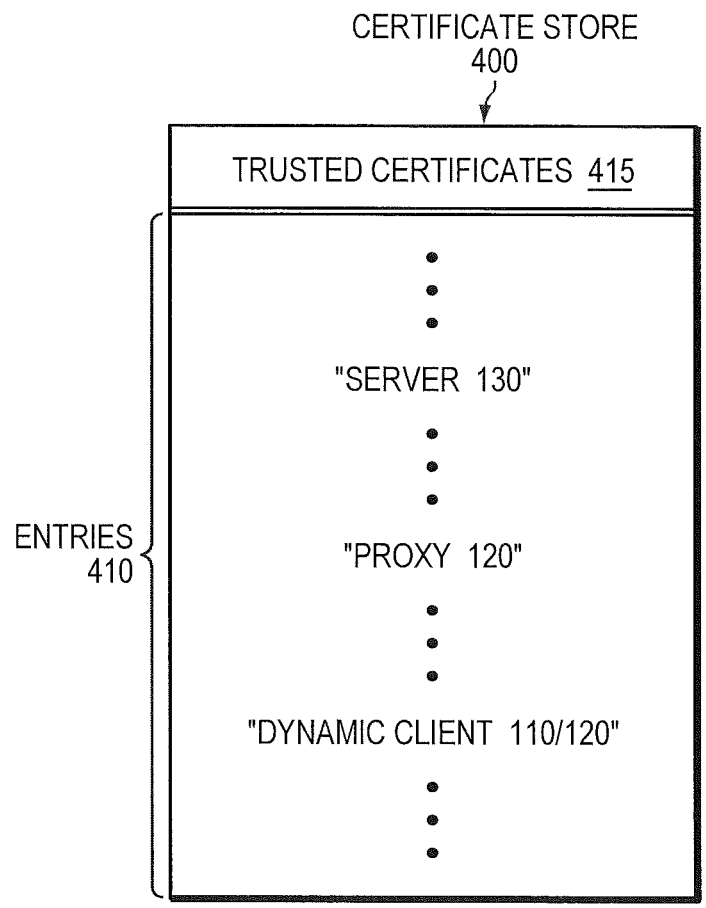
FIG. 4 illustrates an example certificate store.

Trusted certificates 323 may be pre-installed in a certificate store of a device 200 (e.g., described herein). FIG. 4 illustrates an example certificate store 400 that may be advantageously used in accordance with one or more embodiments described herein. Certificate store 400 is illustratively stored in volatile or non-volatile memory (e.g., flash memory) 240 and may include one or more entries 410, each comprising a field for storing a trusted certificate 415. The certificate store 400 is illustratively maintained and managed by security services 245. To that end, the security services 245 may be configured with a list of trusted certificates, and receive and authenticate certificates from security messages 300, as will be understood by those skilled in the art. Notably, a "certificate authority" (or "certification authority") (CA) may be used as an independent third-party to issue trusted certificates, as will also be understood by those skilled in the art. That is, any device that is configured to trust the CA can assume that the certificates issued by the CA may also be trusted.

Returning to FIG. 2, firewall services 247 (i.e., for proxy device/firewall 120) contain computer executable instructions executed by processor(s) 220 to perform functions related to firewall functionality. For example, firewall services 247 may inspect traffic (e.g., data, packets, etc.) received on one or more network interfaces 210 of the device 200. Based on one or more policies applied to traffic (e.g., information contained within the traffic from a physical Layer 1 to an application Layer 7, as will be understood by those skilled in the art), the firewall services 247 may permit forwarding of the traffic or deny the traffic from being forwarded accordingly. Example firewall devices 200 are the Cisco PIX 500 Series firewalls and the Cisco ASA 5500 Series firewalls, both available from Cisco Systems, Inc. of San Jose, Calif. Illustratively, as mentioned above, the firewall/proxy 120 may be located between a client and a server (e.g., between an IP phone and a call controller of a VoIP session).

NAT services 248 (i.e., for proxy device 120) contain computer executable instructions executed by processor(s) 220 to perform functions related to Network Address Translation (NAT). For example, devices 200 performing NAT (e.g., a proxy/firewall 120) may receive traffic having certain network addresses (e.g., source and/or destination addresses) that may require translation before being forwarded any further. For instance, certain networks may assign a particular network address to a device, e.g., a private network address, which when leaving the private network may require modification by a NAT device 200, e.g., into a public network address. Other NAT services will be understood by those skilled in the art (such as, e.g., changing a network port address), wherein each service possibly requires modification of the traffic sent through the NAT device 200 (e.g., proxy/firewall 120).

As noted, however, encrypted traffic (e.g., encrypted VoIP traffic) generally may not be inspected by a firewall. That is, because of its inability to decrypt the traffic, the firewall is unable to deeply inspect the traffic payload. In addition, a proxy (e.g., firewall) is also unable to modify the traffic (e.g., for NAT services 248), since the modified encrypted traffic would (most likely) not match an encryption hash expected at the receiving device, since the firewall is also unable to properly encrypt the modified traffic, as will be understood by those skilled in the art.

Transparent Proxy of Security Sessions

According to embodiments of the disclosure, at least one server 130 and at least one client 110 are configured to trust a proxy certificate of an intermediate proxy device (e.g., for proxy device 120). To establish the trust relationship, one or more proxy certificates may be installed (e.g., through offline provisioning/manual configuration) into the server's certificate store 400. For example, the proxy certificate may be a CA certificate that is capable of signing other proxy certificates, and may be at least a "root" certificate and, optionally, one or more other non-root proxy certificates issued by a "root" CA, as will be understood by those skilled in the art and further described herein. By installing the proxy certificate on the server 130, the server is thus configured to trust the proxy device 120 accordingly.

Illustratively, to establish the trust relationship on the clients 110, the certificate store 400 of the clients may be populated by the server 130 (i.e., the server "pushes" the certificates to the client), e.g., particularly where the client is an IP phone and the server is a call controller, as will be understood by those skilled in the art. For instance, VoIP endpoints (clients/IP phones 110) are generally provisioned centrally via the call controller (server 130), where the provisioning of trust is carried out on the call controller, and the results are pushed down to the clients. This effectively removes the need for human/user intervention/configuration on each endpoint to accept the proxy device's certificate. Illustratively, the proxy certificate pushed to the clients need not be the proxy device's root or CA certificate, but may be any certificate that may be generated by the proxy device 120 (e.g., with the subject name and public key of the proxy device, signed by the private key of the proxy device) and used with the clients 110, as described below. This proxy certificate may be issued by the proxy device (e.g., to the one or more servers 130) to be used on behalf of a particular server (e.g., call controller) or a plurality of servers (e.g., call controller cluster), also as described below.

Figure 5:
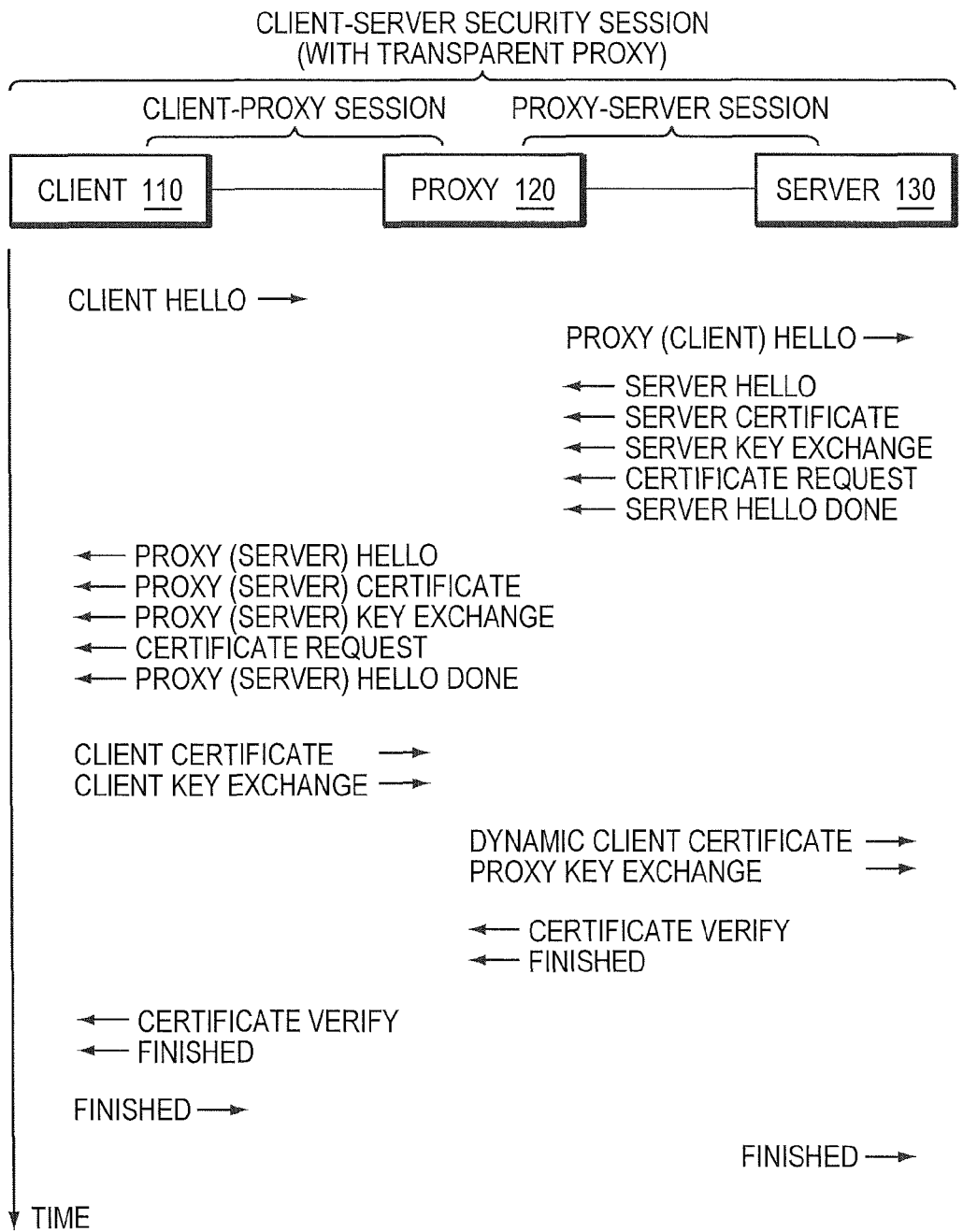
FIG. 5 illustrates an example message exchange between a client and server through an intermediate proxy device.

Once the trust relationship is established at both the client and the server, the proxy device 120 may intercept a client-server security session request message 300 sent from the client 110 to the server 130. FIG. 5 illustrates an example message exchange between the client 110 and server 130 through an intermediate proxy device 120 in accordance with one or more embodiments described herein. For instance, when the client wishes to initiate a security session (e.g., an encrypted session), such as a VoIP "call" from an IP phone to a call controller, the client may send a requesting handshake (e.g., TLS "Hello") to the server. The intermediate proxy device 120 receives the handshake (message 300), and intercepts it accordingly.

In response to intercepting the message 300, the proxy device 120 apportions the requested client-server security session into two separate sessions, namely a client-proxy session and a proxy-server session. To do this, the proxy device initiates the proxy-server security session with the server 130 through a new security session request message 300, where the proxy acts as a "client" for the server. Upon receiving the proxy (client) request from the proxy device, the server returns server security information (e.g., in one or more response messages 300). For instance, the server security information may begin and end with a "Hello" and "Hello done" indication, and may comprise the server's certificate 323, key exchange 324, and optionally a certificate request (e.g., field 325).

Prior to responding to the server (as the client would conventionally do), the proxy device 120 may initiate (or, e.g., continue unbeknownst to the client) the client-proxy security session with the client 110 using the trusted proxy certificate, where the proxy acts as the "server" for the client. In other words, the proxy device 120 may send "server" security information to the client in a similar manner to the actual server 130, but with security information of the proxy. Because the proxy certificate is already trusted by the client (e.g., not necessarily the root certificate of the proxy), the proxy device 120 may be authenticated by the client as a proper server for the client-proxy security session (which, notably, appears to the client as the requested client-server security session). Alternatively, the proxy device may create a "dynamic certificate" (as described below) and contain the dynamic certificate in the "server" security information to the client.

Upon receiving the proxy device's "server" security information, the client 110 responds with client security information, e.g., in a response message 300. For instance, the proxy device 120 obtains from the client 110 the client's certificate, which comprises the client's subject name (e.g., "client") and a signature generated (signed) by the client certificate issuer (e.g., a trusted CA). The client security information may also include the client's public key, which is used by the proxy to authenticate the client certificate, as will be understood by those skilled in the art.

Once the client security information is obtained, particularly the client's subject name extracted from the decrypted certificate, the proxy device 120 may create a "dynamic certificate" using the obtained client security information (e.g., the subject name) and the trusted proxy certificate accordingly. That is, the proxy device 120 may generate a dynamic (client) certificate by signing the client's subject name ("client") using the proxy device's private key (e.g., for the CA certificate of the proxy device). This newly created dynamic certificate effectively mimics the properties of the original client certificate (i.e., it appears as the client to the server through the trusted proxy CA certificate), without compromising the security measures in place at the client (e.g., the proxy device does not need the client's private key). For instance, the dynamic certificate may be created using the client's signature algorithm and/or certificate extensions, as will be appreciated by those skilled in the art.

Accordingly, the proxy device 120 may then establish the initiated proxy-server security session with the dynamic certificate. The server 130 authenticates the "client" (i.e., the proxy device acting as the client) by verifying the dynamic certificate with the public key of the proxy device (e.g., the CA of the proxy device). For instance, once the proxy device's CA certificate is installed in the certificate store 400 of the server 130, certificates signed by the CA of the proxy device may also be trusted at the server in a "chained" certificate manner, as will be understood by those skilled in the art. For example, if the server trusts the CA certificate of the proxy device, the server may also trust other certificates signed by the CA of the proxy device. In this manner, the proxy device 120 transparently appears as the client to the server 130 in the proxy-server security session (i.e., for any client 110a-c connected to the proxy device). The server then responds to the proxy device (as though it were the client) with a certificate verification and finish message 300 to establish the proxy-server security session.

The proxy device 120 may then establish the initiated client-proxy session by sending a similar certificate verification and finish message 300 to the client 110 (the proxy device now acting as the server). The client 110 and proxy device 120 may each send a return finish message 300 to the proxy device and server 130, respectively, to complete the establishment of the client-proxy and proxy-server security sessions. The proxy device 120 (e.g., proxy services 244) thus transparently proxies the connection between the client/server endpoints of a client-server security session. In other words, the client-proxy security session and proxy-server security session transparently appear to the client 110 and server 130 as the requested client-server security session.

Accordingly, neither the client nor the server is required to be provisioned to specifically communicate with the proxy device, and instead may simply attempt to directly connect to the peer (server or client, respectively) over an apparent client-server security session. The two actual security sessions, i.e., the client-proxy and proxy-server, may be coordinated by the proxy, such as for handshakes, resume handshakes, authentication, etc., as will be appreciated by those skilled in the art. For instance, in response to receiving a client-server security session tear-down request, the proxy device 120 may correspondingly tear down each security session. Notably, the dynamic certificates may be scoped by session, i.e., may only be valid during the particular client-server (proxy-server) session. Once the session is "torn down" (terminated), the dynamic certificates may be removed from the server and proxy device. (Also, to further regulate security measures, the dynamic certificates may not be issued to any host enrolled with the CA, and the dynamic certificates may be illustratively constrained to a proxy type, as will be understood by those skilled in the art.)

In accordance with one or more embodiments described herein, the proxy device 120 may be illustratively configured as a firewall and/or NAT device. As such, the firewall services 247 (or NAT services 248) may advantageously utilize the techniques described above to decrypt received traffic from the client 110 and server 130, and to re-encrypt the traffic accordingly. In particular, because the proxy device 120 is a transparent intermediary to the client-server security session, the proxy device is able to decrypt the received traffic/packets (e.g., using the session key negotiated for the client-proxy or proxy-server session, as appropriate) from each sending end device, and may re-encrypt the traffic prior to forwarding it on using the respective session key with the receiving end device. In this manner, the traffic is decrypted solely for the proxy device, and deep packet inspection (e.g., for firewalls) may be performed appropriately. The proxy device may then re-encrypt the deeply inspected traffic prior to forwarding it to the receiving end device. Also, when modifying the packets (e.g., for NAT), the newly re-encrypted traffic will match the expected encryption algorithm's hash at the receiving end device because the proxy device is now the expected (re-) encrypting device.

Figure 6:
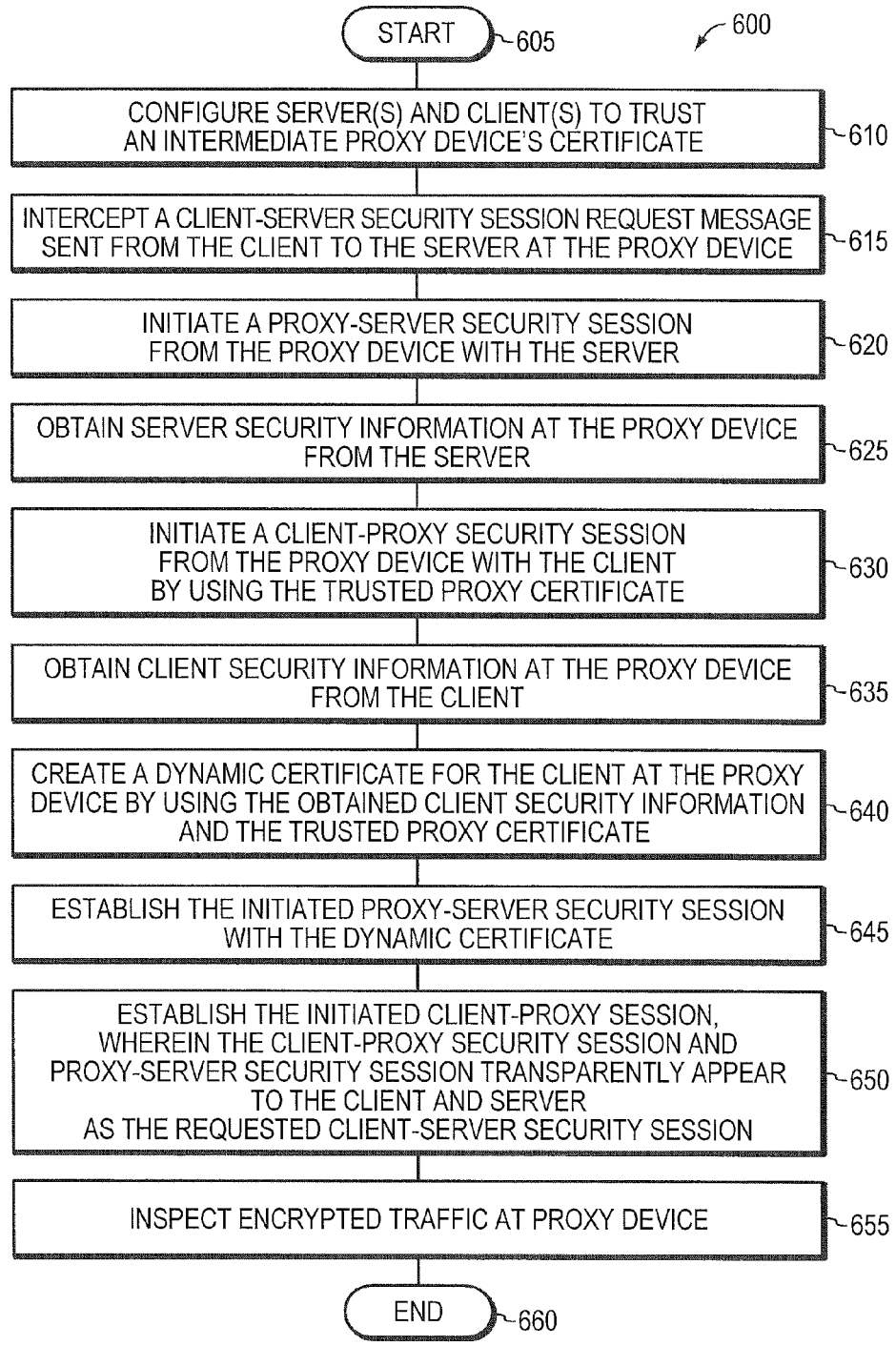
FIG. 6 illustrates an example procedure for proxying a security session between a client and a server.

FIG. 6 illustrates an example procedure for proxying a security session between a client and a server in accordance with one or more embodiments described herein. The procedure 600 starts at step 605, and continues to step 610, where at least one client 110 (e.g., an IP phone) and at least one server 130 (e.g., a call manager) are configured to trust a certificate of an intermediate proxy device 120 (e.g., a firewall). For instance, the server 130 is configured to trust the proxy certificate (e.g., through off-line provisioning), and that trust relationship is pushed down to the one or more clients 110, as described above. Once the trust relationship is established, the proxy device 120 may intercept a client-server security session request message sent from the client 110 to the server 130 in step 615.

Upon intercepting the client-server security session request message, the proxy device 120 initiates a proxy-server security session with the server 130 in step 620. During the proxy-server session, the proxy device obtains server security information (e.g., a certificate 323 and/or public key 324) from the server in step 625, such as from the server's response to the session request message (e.g., a security message 300). Based on the server's response, the proxy device initiates a client-proxy security session with the client in step 630 using the trusted proxy certificate of the proxy device as described above (e.g., a proxy certificate stored in the client's certificate store 400).

In response to the initiated client-proxy security session, the proxy device 120 obtains client security information from the client in step 635 (e.g., a certificate 323 and/or public key 324). Using the obtained client security information (e.g., the subject name 326) and the trusted proxy certificate as described above, the proxy device creates a dynamic certificate for the client's subject name in step 640, and establishes the previously initiated proxy-server security session in step 645 by sending the dynamic (client) certificate to the server. The proxy device 120 may then establish the initiated client-proxy session in step 650, wherein the client-proxy security session and proxy-server security session transparently appear to the client and server as the requested client-server security session. With the established client-proxy and proxy-server security sessions acting transparently as a client-server security session, the proxy device may be allowed to inspect the traffic between the client and the server in step 655, such as by decrypting and re-encrypting the traffic accordingly. As mentioned above, the proxy device may also tear down the security sessions in response to either the client or the server requesting a tear-down of the client-server security session. The procedure 600 ends in step 660.

Advantageously, the novel techniques described herein proxy a security session between a client and a server in a computer network. By proxying the security session, the novel techniques allow for the proxy (e.g., a firewall) to inspect the encrypted traffic of the session and to perform other services that require decryption of the traffic (e.g., NAT services). In particular, the techniques described above allow for transparent operation of proxied security sessions between the client (e.g., an IP phone) and the server (e.g., a call controller) as though the client and server were communicating over a client-server security session. In addition, the dynamic aspects of one or more embodiments described herein alleviate the need for cumbersome and inefficient manual configuration. For instance, IP phone operation (e.g., for VoIP communications) does not require end-user intervention, particularly to establish trust for the proxy/firewall or to configure the IP phone to communicate with the firewall.

Figure 7:
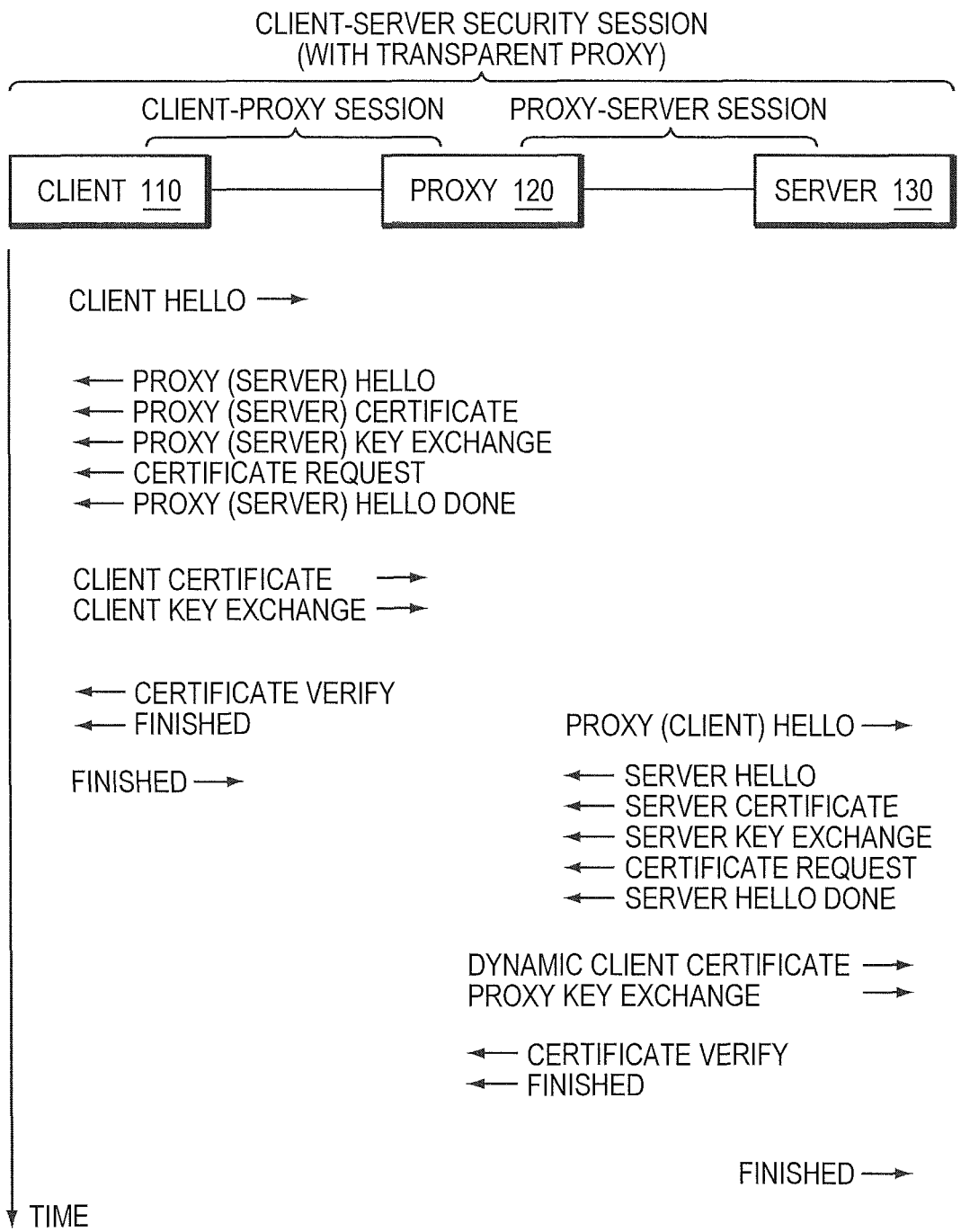
FIG. 7 illustrates another example message exchange between a client and server through an intermediate proxy device.

While there have been shown and described illustrative embodiments that proxy a security session between a client and a server in a computer network, it is to be understood that various other adaptations and modifications may be made within the spirit and scope of the present invention. For example, the embodiments have been shown and described herein with reference to an illustrative TLS security session. However, the embodiments of the invention in their broader sense are not so limited, and may, in fact, be s used with other sessions (e.g., SSL and IPSec as mentioned above), and the exact order of the messages/exchange shown (e.g., in FIG. 5) may be modified within the scope of the present invention. For instance, the proxy device need not initiate the proxy-server security session until after the client-proxy security session is established (as illustrated in FIG. 7). This alternative has the advantage of preventing attacks from the client side and avoiding the overhead of initiating unnecessary proxy-server security sessions. Note that the proxy (client) "hello" message may be sent from the proxy 120 to the server 130 along with the "finished" message from the proxy to the client 110 as shown, or instead may be sent following a received "finished" message from the client to the proxy. As another instance, provided that the proxy device 120 has the client's subject name, the proxy device need not wait for a client response prior to creating the dynamic certificate and establishing the proxy-server security session, as will be appreciated by those skilled in the art after understanding the techniques described above. Further, while one or more illustrative embodiments show one client and one server, other embodiments may be possible with more than one client and/or more than one server interconnected with an intermediate proxy device, as will be understood by those skilled in the art. Also, while in one or more embodiments the proxy device 120 is a firewall and/or NAT device, the proxy device may be embodied as other network devices that would benefit from the advantages provided by a proxied security session.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   intercepting, at a proxy device locate between a first device and a second device in a computer network, a security session request for a security session between the first device and the second device;
   obtaining, at the proxy device, security information from the first device, the security information from the first device including at least a subject name of the first device;
   creating a dynamic certificate using the subject name of the first device and a trusted proxy certificate of the proxy device;
   establishing a security session between the proxy device and the second device using the dynamic certificate; and
   establishing a security session between the first device and the proxy device using the trusted proxy certificate of the proxy device, wherein the security session between the first device and the proxy device and the security session between the proxy device and the second device collectively operate as a security session between the first device and the second device.

2. The method of claim 1, wherein creating a dynamic certificate comprises:
   signing the subject name of the first device using a private key of the proxy device.

3. The method of claim 1, wherein establishing a security session between the proxy device and the second device comprises:
   verifying the dynamic certificate using a public key of the proxy device.

4. The method of claim 1, further comprising:
   subsequent to establishing a security session between the first device and the proxy device, inspecting, at the proxy device, encrypted traffic between the first device and the second device.

5. The method of claim 4, wherein the inspecting comprises:
   decrypting, at the proxy device, the encrypted traffic;
   inspecting the decrypted traffic;
   re-encrypting the decrypted traffic; and
   forwarding the re-encrypted traffic from the proxy device to the first device or the second device.

6. The method of claim 1, further comprising:
   configuring the first device and the second device to trust the proxy certificate by installing the proxy certificate on the first device and the second device.

7. The method of claim 1, further comprising:
   initiating the security session between the proxy device and the second device;
   obtaining security information for the second device at the proxy device; and
   initiating the security session between the first device and the proxy device.

8. The method of claim 1, further comprising:
receiving a security session tear down request for either the security session between the proxy device and the second device or the security session between the first device and the proxy device; and
in response to the receiving, tearing down both the security session between the proxy device and the second device and the security session between the first device and the proxy device.

9. The method of claim 1, wherein the security session between the first device and the proxy device and the security session between the proxy device and the second device include a Transparent Layer Security (TLS) session or a Secure Socket Layer (SSL) session.

10. The method of claim 1, wherein the first device is a client and the second device is a server.

11. An apparatus comprising:
one or more network interfaces configured to communicate with a plurality of devices in a computer network, the plurality of devices including a first device and a second device;
one or more processors coupled to the network interfaces and configured to execute one or more processes; and
a memory configured to store a proxy security process executable by the one or more processors, the proxy security process, when executed, operable to:
intercept a security session request for a security session between the first device and the second device,
obtain security information from the first device, the security information from the first device including at least a subject name of the first device,
create a dynamic certificate using the subject name of the first device and a trusted certificate of the apparatus,
establish a security session between the apparatus and the second device using the dynamic certificate, and
establish a security session between the first device and the apparatus using the trusted certificate of the apparatus.

12. The apparatus of claim 11, wherein the proxy security process is further, when executed, operable to:
sign the subject name of the first device using a private key of the apparatus to create the dynamic certificate.

13. The apparatus of claim 11, wherein the proxy security process is further, when executed, operable to:
inspect encrypted traffic between the first device and the second device.

14. The apparatus of claim 13, wherein the proxy security process is further, when executed, operable to:
decrypt the encrypted traffic;
inspect the decrypted traffic;
re-encrypt the decrypted traffic; and
forward the re-encrypted traffic from the one or more network interfaces of the apparatus to the first device or the second device.

15. The apparatus of claim 11, wherein the proxy security process is further, when executed, operable to:
initiate the security session between the apparatus and the second device;
obtain security information for the second device; and
initiate the security session between the first device and the apparatus.

16. The apparatus of claim 11, wherein the proxy security process is further, when executed, operable to:
in response to a security session tear down request for either the security session between the apparatus and the second device or the security session between the first des vice and the apparatus, tear down both the security session between the apparatus and the second device and the security session between the first device and the apparatus.

17. The apparatus of claim 11, wherein the security session between the first device and the apparatus and the security session between the apparatus and the second device include a Transparent Layer Security (TLS) session or a Secure Socket Layer (SSL) session.

18. The apparatus of claim 11, wherein the apparatus is a proxy device, the first device is a client and the second device is a server.

19. A non-transitory computer-readable medium including software encoded thereon that, when executed, is operable to:
intercept a security session request for a security session between a first device and a second device;
obtain security information from the first device, the security information from the first device including at least a subject name of the first device;
create a dynamic certificate using the subject name of the first device and a trusted proxy certificate of a proxy device;
establish a security session with the second device using the dynamic certificate; and
establish a security session with the first device using the trusted proxy certificate of the proxy device, wherein the security session with the first device and the security session with the second device collectively operate as a security session between the first device and the second device.

20. The non-transitory computer readable medium of claim 19, wherein the first device is a client, the second device is a server, and the security session with the first device and the security session with the second device include a Transparent Layer Security (TLS) session or a Secure Socket Layer (SSL) session.

* * * * *